United States Patent [19]

Reichard, Jr.

[11] 3,751,600

[45] Aug. 7, 1973

[54] COMBINATION MICROPHONE AND CONTROL STAND FOR LOUDSPEAKING TELEPHONE SET

[75] Inventor: George Willis Reichard, Jr., Indianapolis, Ind.

[73] Assignee: Bell Telephone Laboratories Incorporated, Murray Hill, Berkeley Heights, N.J.

[22] Filed: Dec. 22, 1971

[21] Appl. No.: 210,642

[52] U.S. Cl. ........... 179/100 L, 179/1 HF, 179/147, 179/179, 179/184

[51] Int. Cl. ......................... H04m 1/62, H04m 1/20

[58] Field of Search .................. 179/1 E, 1 H, 1 HF, 179/100 R, 100 D, 100 L, 158, 159, 164, 160, 178, 179, 146 R, 147; D26/14 A

[56] References Cited

UNITED STATES PATENTS

| | | | |
|---|---|---|---|
| 3,069,508 | 12/1962 | Boeryd et al. | 179/1 HF |
| 2,578,367 | 12/1951 | Mott | 179/100 D |
| R26,034 | 6/1966 | Nise et al. | 179/100 L |
| 3,124,657 | 3/1964 | Peterson | 179/1 HF |
| 2,885,477 | 5/1959 | Smith | 179/1 HF |
| 2,392,321 | 1/1946 | Hersey | 179/100 D |

*Primary Examiner*—Kathleen H. Claffy
*Assistant Examiner*—Randall P. Myers
*Attorney*—W. L. Keefauver et al.

[57] ABSTRACT

In a combination control stand and microphone support structure for a loudspeaking telephone set, an omnidirectional microphone is mounted within a pedestal supported body portion with the top thereof providing a base for control switch actuating buttons, the microphone being entirely hidden from view with its face pointing downwardly at the desk top or other supporting structure.

3 Claims, 2 Drawing Figures

COMBINATION MICROPHONE AND CONTROL STAND FOR LOUDSPEAKING TELEPHONE SET

BACKGROUND OF THE INVENTION

1. Field of the Invention

This invention relates to loudspeaking telephone sets and more particularly to the microphone mounting arrangements employed in such sets.

2. Description of the Prior Art

Loudspeaking telephone sets have been available commercially for a number of years, and despite the potentially attractive features offered by such sets, their use has consistently been less than even conservative estimates have predicted. Although substantial improvements have been made in the voice networks of such sets, including effective electronically implemented voice switching as disclosed, for example, by R. L. Breeden in U.S. Pat. application, Ser. No. 171,550, filed Aug. 13, 1971, unsolved problems still exist that adversely affect their operation and hence limit the commercial appeal they otherwise would enjoy.

One of the more persistent of these problems concerns the microphone and relates specifically to the type of microphone that is employed as well as to the mounting and housing structure thereof. In some prior art sets, the microphone is enclosed in a separate box-like housing positioned hopefully at a distance far enough removed from the loudspeaker element to reduce the effects of acoustic feedback. In other known sets the microphone is positioned in an inset on the sloping front face of the loudspeaking telephone set housing. In either case, it is essential for the speaker to position himself within a very limited area in order to be within the specific directional limitations of the microphone, and in many instances the particular physical relation between the microphone and the loudspeaker virtually ensures the presence of an annoying level of acoustic feedback.

A further shortcoming in prior art microphones stems from the fact that the delicate portions of the transducer are undesirably exposed to both inadvertent and intentional damage which may occur, for example, from liquids being spilled into the relatively open microphone face or from sharp pencils or other foreign objects being poked through the grill cloth or apertured grill work.

Accordingly, the general object of the invention is to improve loudspeaking telephone microphone arrangements in order to avoid the problems indicated.

SUMMARY OF THE INVENTION

The general object and additional related objects are achieved in accordance with the principles of the invention by an omnidirectional microphone for a loudspeaking telephone set that is mounted uniquely in a dual function housing and support structure. The microphone is mounted inside the structure, its principal axis being vertical, or nearly so, with the face thereof pointing downwardly toward the desk, table top or other supporting surface. The spacing between the supporting surface and the microphone face is ideally close, less than an inch, for example, so that there is little or no access to the microphone except for acoustic waves generated by the user, and these may be applied effectively from any direction.

In accordance with an important feature of the invention, the microphone mounting structure serves a second function in that it provides a base for the principal loudspeaking telephone control switches, namely, the ON/OFF switch, the QUIET or muting switch and the volume control thumbwheel. As a result of combining the feature of a pedestal-type mounting structure with the feature of positioning control switches on the upper surface thereof, the entire assembly has the appearance of a miniature control stand. Additional protection for the microphone is provided in accordance with the invention inasmuch as it is entirely hidden from the view of a casual observer.

DETAILED DESCRIPTION

Figure 1:
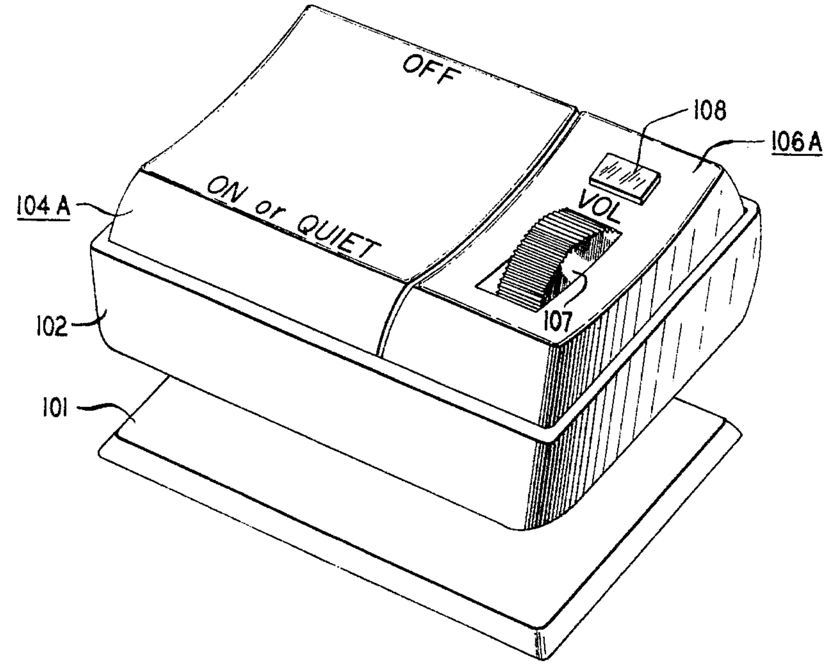
FIG. 1 is a sketch in front perspective view of a combination control stand and microphone assembly for a loudspeaking telephone in accordance with the invention.
Figure 2:
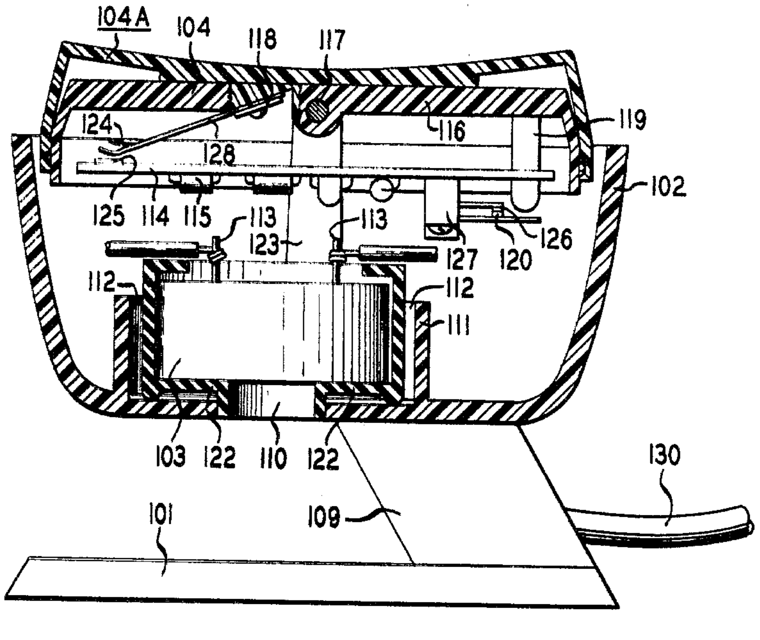
FIG. 2 is a cross-section view of the assembly shown in FIG. 1.

As shown in FIGS. 1 and 2, a structure in accordance with the invention includes a main body portion 102 mounted on a pedestal member 109 which, in turn, is supported on a substantially flat base 101. Inside the lower portion of the body 102 is an integral inwardly protruding collar 111 which forms a cavity 112 for positioning an omnidirectional microphone 103. The microphone assembly includes a supporting frame 122, preferably of rubber-like or other resilient material, the lower or bottom portion of which is shaped to form an acoustic passage 110. The microphone 103 is thus positioned to face downwardly toward the base 101 and the space between the base 101 and the acoustic passage 110 is preferably between one-half inch and an inch. Terminals 113 are affixed at the rear or upper portion of the microphone 103.

Also mounted within the main body 102 is a vertical frame element 123 which supports a pin 117 that serves as a pivotal mount for a rocker arm switch actuating button 104. The button 104 is in turn actuated by a concave button cover element 104A. The cover 106A is fixed and acts as a shield for the volume control thumbwheel 107 and the light-emitting diode 108. The ON switch assembly includes a switch spring 128 positioned by a mounting element 118, the spring terminating in the movable bifurcated contacts 124 which cooperate with the fixed contact 125. The OFF switch assembly includes a switch actuating stud 119, a movable switch contact 120, a fixed switch contact 126 and a contact spring mounting block 127. The muting or QUIET switch, not shown, is operated by a second depression of the ON side of the ON/OFF button cover 104A after it has already been placed in the ON position.

Apertures in the button cover element 106A provide for the mounting of a volume control knob 107 and an ON/OFF indicator light-emitting diode 108. Circuitry 115 involved with the switches and volume control indicated is mounted on a circuit board 114 which in turn is supported by the frame element 123. The unit is connected to the rest of the speakerphone system, not shown, by a cable 130.

As illustrated, the microphone 103 is fully protected from potentially disrupting outside instrumentalities, and the entire structure appears to the casual observer, to be simply a small switch control stand. The microphone mounting portion of the assembly has been found to provide superior results when an omnidirectional microphone is used. For example, frequency response over the 350–3,500 Hz range is uniformly excellent.

An important feature of the invention is that although an omnidirectional microphone is preferred, a microphone which is normally directional performs substantially as an omnidirectional transducer when mounted in the structure shown and described.

It is to be understood that the embodiment disclosed herein is merely illustrative of the invention and that various modifications thereto may be effected without departing from the spirit and scope of the invention.

What is claimed is:

1. A combination control stand and microphone assembly for a loudspeaking telephone set comprising a body portion comprising an open top enclosure for containing electrical circuit elements of said telephone set, a substantially cylindrical microphone also contained in said enclosure, said microphone being mounted in said enclosure facing downwardly and with its principal axis substantially vertical, said enclosure having a port in its underface to provide access to said microphone for acoustic energy, a base for said assembly having a horizontal planar surface substantially normal to said axis and including a pedestal for maintaining said underface of said enclosure and said planar surface in a predetermined spaced apart relationship and to provide equal response of said microphone to predetermined acoustic signals generated at equidistant points randomly located about said axis, and a lid for covering said enclosure, at least a portion of said lid being pivotally mounted in said enclosure for manually controlling particular ones of said circuit elements.

2. Apparatus in accordance with claim 8 wherein the mouth of said port is less than one inch above said base.

3. Apparatus in accordance with claim 1 wherein a fixed portion of said lid has an aperture extending through the surface thereof and a volume control operating means extending through said aperture.

* * * * *

UNITED STATES PATENT OFFICE
CERTIFICATE OF CORRECTION

Patent No. 3,751,600 Dated August 7, 1973

Inventor(s) George Willis Reichard, Jr.

It is certified that error appears in the above-identified patent and that said Letters Patent are hereby corrected as shown below:

In the Claims, Column 4, Line 17, "8" should read --1--.

Signed and sealed this 29th day of January 1974.

(SEAL)
Attest:

EDWARD M.FLETCHER,JR.
Attesting Officer

RENE D. TEGTMEYER
Acting Commissioner of Patents